INVENTOR.
JOHN E. MAGEE.

United States Patent Office 3,179,917
Patented Apr. 20, 1965

3,179,917
INDICATORS FOR ELEVATOR SYSTEMS
John E. Magee, Greenburgh, N.Y.
(191 Forest Blvd., Ardsley, N.Y.)
Filed May 8, 1961, Ser. No. 108,444
6 Claims. (Cl. 340—21)

The invention relates to indicating systems for one or more elevators and is particularly applicable to indicators of car positions and indicators of locations of waiting passengers.

It is found advisable with many elevator installations to furnish an indicator panel, generally located at the lower terminal, for providing information to supervisory personnel as to positions of cars, their directions of travel and locations of prospective passengers, segregated as to intended direction of travel. To accomplish this it is common practice to utilize an indicator comprising a column of lights per car, the number of lights in a column being equal to, or substantially equal to, the number of stops; a pair of car direction of travel lights per elevator; and two columns of waiting passenger lights to indicate floor locations of registered up landing calls and registered down landing calls.

The invention disclosed herein accomplishes substantially the same result, independent of the number of elevators, utilizing merely two columns of indicator lights comparable to those heretofore utilized to provide waiting passenger data only. It also incorporates switching means for selective use of the arrangement as either a car position indicator, as a waiting passenger indicator or both. Said switching means also permits deactivation of the indicator system whenever its use is not desired for supervisory purposes.

It is therefore an object of this invention to provide an economical, simplified indicator system for one or more elevators.

In carrying out the invention according to the preferred embodiment two columns of indicators lights are utilized. These consist of a column of green up indicator lights, one per floor excepting the upper terminal, and a column of red down indicator lights, one per floor excepting the lower terminal. As in conventional systems registered down landing calls result in illumination of corresponding lights in the red column and registered up landing calls result in illumination of corresponding lights in the green column, both fed from a conventional source of power. By utilizing an altered power source in conjunction with group position indicator circuitry the same two columns of indicator lights are arranged to convey information as to locations and directions of travel of cars as well as serving their conventional waiting passenger indicating purpose. The group position indicator circuitry mentioned will provide information that an elevator is at a particular point of travel in the building and is set for upward or downward travel, as the case may be, but will not in itself disclose which specific car of a group is so oriented. However, this is not a disadvantage in many installations, and the simplicity, lower cost and space saving accomplished by the invention justifies its use in many instances.

The group position indicator arrangement utilized in the preferred embodiment of the invention herein is disclosed in Patent No. 2,944,634. However, it will be apparent to those skilled in the art that for purposes of this invention, position and direction responsive mechanism of other conventional systems could be utilized to operate the indicator panel which is part of the invention. Similarly selector elements of said Patent No. 2,944,634 may be used directly, without use of the intervening relays described herein. Such circuitry may also be supplanted by switches located in the hoistway and actuatable by cams carried on the cars as is well known in the art.

Features and advantages of the invention will be seen from the above, from the following description of the operation of the preferred embodiment of the invention which should be considered in conjunction with the accompanying drawing and in which.

Although the invention herein disclosed is not limited in application to any particular type of cooperating elevator control, for clarity and convenience it will be described in conjunction with that system of control disclosed in said Patent No. 2,944,634. Selector contacts UH1a through UH16a and DH2a through DH17a of FIG. 2 of said Patent No. 2,944,634 are repeated in FIG. 1 of this disclosure for clarity. Similarly contacts 1PIU3 through 16PIU3 and 2PID3 through 17PID3 may be considered as additional contacts of associated relays shown in FIG. 3 of said Patent No. 2,944,634. It may be noted that the indicator of this invention may supplant the indicator system shown in FIG. 6 of said Patent No. 2,944,634.

Figure 1:
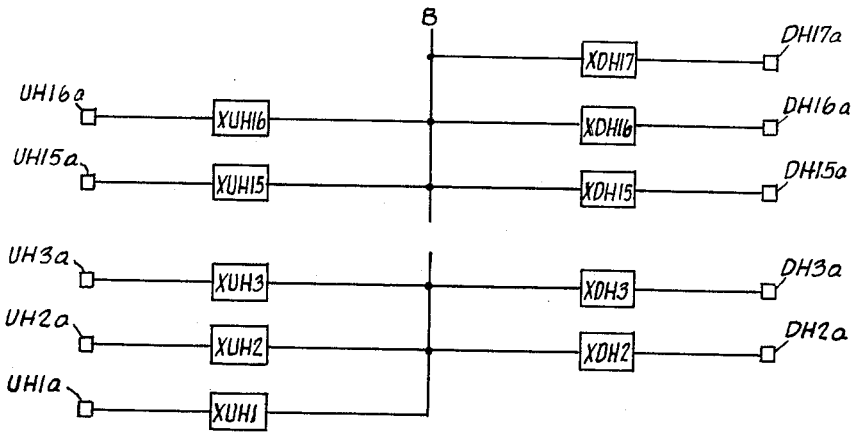
FIG. 1 is a simplified schematic wiring diagram of waiting passenger determining circuits.
Figure 2:
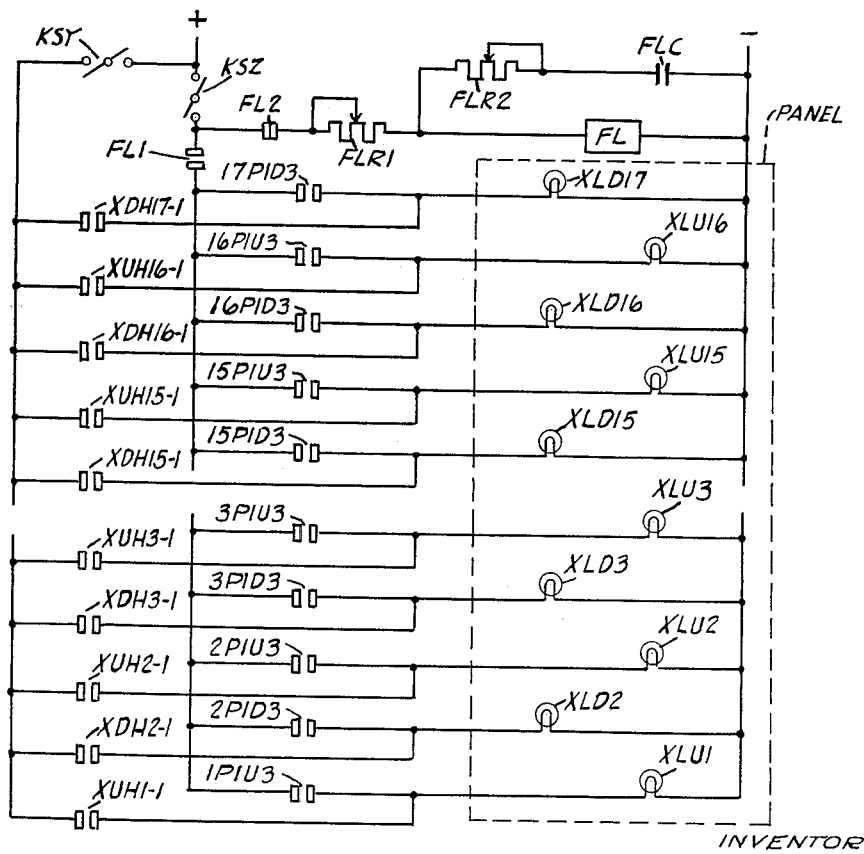
FIG. 2 is a simplified wiring diagram of the dual-indicator circuitry as well as power alteration circuits and deactivation means.

It will be understood from said Patent No. 2,944,634 that while a landing call is in registration its associated UH or DH selector contact, duplicated in FIG. 1 herein, will complete a circuit with respect to feed line B. It can thus be seen in FIG. 1 that an associated XUH or XDH switch would be thus activated until the call was cancelled by a responding car. As shown in FIG. 2, contacts of XUH and XDH switches, with key switch KSY assumed closed, control steady illumination of their respective XLU and XLD indicator lights. This conforms to conventional arrangements for waiting passenger, or registered landing call, indication.

With key switch KSZ in FIG. 2 closed energization of the FL coil circuit will result. Its actuation is delayed, however, say a half-second, until condenser FLC is charged to a permissive voltage through adjustable resistors FLR1 and FLR2. From said Patent No. 2,944,634 it will be seen that if a car were at the 16th landing set for upward travel, or travelling upward, contacts 16PIU3 would be closed. When FL switch is actuated then closing of contacts FL1 will complete a circuit to indicator lamp XLU16. Contacts FL2 opening would interrupt power feed to the FL coil circuit but condenser FLC would sustain switch FL during part of its discharge cycle, say for one-half second. Upon dropping out switch FL opens contacts FL1 to interrupt illumination of indicator lamp XLU16 but closes contacts FL2 for repetition of the preceding cycle, the lamp XLU16 flickering during the period contacts 16PIU3 remain closed.

It can be seen then that FIG. 1 shows supplementary switches actuatable upon registration of an associated landing call. Similar relays with other types of control may be directly actuated by landing button devices and reset or released on approach of a responding car in any conventional manner. FIG. 2, with key switch KSY closed utilizes a primary, steady source of power for illumination of indicator lamps in a conventional manner as indicators of location and direction of registered landing calls. FIG. 2 also shows a modified power source, pulsating at a visible rate, for illumination of lamps in the same two columns to indicate positions and directions of elevators, this latter illumination being in a manner distinguishably different from illumination of lights of the two banks for waiting passenger indicating purposes. It may be noted that other known types of low frequency or pulsating power sources, such as commercial flickering devices, may be used to supplant the FL switch and its associated contacts and circuits shown.

Key switches KSY and KSZ which may be located in the indicator lamp panel afford the option of using the indicator independently either as a waiting passenger indicator or as a car position indicator. Also with both key switches in their open positions the device may be deactivated during periods when its observation by responsible personnel is not required. With present day unattended elevators this may constitute a major portion of each day with an appreciable improvement in maintenance life of components compared with presently used full time indicators.

To consider the operation of the preferred embodiment in conjunction with the controls of said Patent No. 2,944,634 assume car $b$ is stopped at the lower terminal set for upward travel, car $c$ is stopped for passenger transfer at the 15th landing and is set for continued upward travel and car $a$ is leaving on its downward trip from the upper terminal. Assume also that a down landing call has been registered at the 15th landing. Assume further that both key switch KSY and key switch KSZ are closed. From the description in said Patent No. 2,944,634, it will be clear that selector floor bar contact DH15 is energized because of the assumed call there. A circuit is then completed to supply line B through switch coil XDH15, actuating that switch. Its contacts XDH15–1 on closing complete a circuit for steady illumination of indicator lamp XLD15.

From said Patent No. 2,944,634 it will be clear that with the cars disposed as assumed, contacts 1PIU3, 15PIU3 and 17PID3 will be closed because of the assumed positions and directions of cars $b$, $c$ and $a$, respectively. These contacts then permit flickering illumination of lamps XLU1, XLU15 and XLD17, respectively, as contacts FL1 alternately close and open.

Car $a$ in descending, as it approaches and passes the 16th landing, will cause flickering illumination of lamp XLD16 and through release of 17PID will cause illumination of lamp XLD17 to cease. Upon approaching the 15th landing, as can be understood from said Patent No. 2,944,634, stopping of the car will be initiated and the registered call at that landing will be cancelled. As a result, the source of energy is removed from selector contact DH15$a$, switch XDH15 is released and its contacts XDH15–1 in FIG. 2 open to extinguish lamp XLD15. At approximately this same time contacts 15PID3 close to cause the prior continuous illumination of lamp XLD15 to be followed by a flickering illumination during dwell of car $a$ at that landing.

It is thus seen that the indicator system of this invention provides information as to location and direction of registered landing calls until a car responds and at the same time serves to disclose the orientation of cars disposed to serve registered calls. Utilization of a common pair of light columns for this dual purpose permits an appreciable saving in material and installation costs as compared with existing indicator systems which furnish comparable operating information.

Many changes in the above described construction and different embodiments of this invention can be made without departing from its scope. Therefore, it is intended that all matter contained in the preceding description or shown on the accompanying drawings be interpreted as illustrative only and not in a limiting sense.

What is claimed is:

1. A system for indicating the positions of a plurality of elevator cars and the directions of movement for which such cars are set and for indicating the floors at which demands for service are registered by demand means and the desired direction of such service, said system comprising a first group of electrically operable indicators for indicating cars set for movement in one direction and demands for service in said one direction, a second group of electrically operable indicators for indicating cars set for movement in the opposite direction and demands for service in said opposite direction, the number of indicators in each group being less in number than the number of said floors plus one and each indicator in each group indicating demands at a floor, which is different from the floors at which demands are indicated by the remaining indicators in a group, means controlled by cars set for movement in said one direction for providing a first indication by the indicator in said first group corresponding to the floor position of a car, means controlled by cars set for movement in said opposite direction for providing a first indication by the indicator in said second group corresponding to the floor position of a car, means controlled by the demand means for registering demands for service in said one direction for providing a second indication by the indicator in said first group corresponding to the floor at which a demand for service is registered, and means controlled by the demand means for registering demands for service in said opposite direction for providing a second indication by the indicator in said second group corresponding to the floor at which a demand for service is registered.

2. A system for indicating the positions of a plurality of elevator cars and the directions of movement for which such cars are set and for indicating the floors at which demands for service are registered by demand means and the desired direction of such service, said system comprising a first group of electrically energizable lamps, a second group of electrically energizable lamps, the number of lamps in each group being less in number than the number of said floors plus one and each indicator in each group indicating demands at a floor, which is different from the floors at which demands are indicated by the remaining indicators in a group, means controlled by cars set for movement in said one direction for providing a first energization of a lamp in said first group corresponding to the floor position of a car, means controlled by cars set for movement in said opposite direction for providing a first energization of a lamp in said second group corresponding to the floor position of a car, means controlled by the demand means for registering demands for service in said one direction for providing a second energization of a lamp in said first group corresponding to the floor at which a demand for service is registered, and means controlled by the demand means for registering demands for service in said opposite direction for providing a second energization of a lamp in said second group corresponding to the floor at which a demand for service is registered.

3. In an elevator system comprising a plurality of elevator cars operable between a plurality of floors and having first means at said floors for registering demands for service in the up direction, and second means at said floors for registering demands for service in the down direction, a pair of groups of indicator lamps, each group comprising a number of lamps which is less than the number of said floors plus one and each lamp in each group indicating demands at a floor, which is different from the floors at which demands are indicated by the remaining indicators in a group, a first power source for energizing and causing said lamps to emit light which is substantially steady to the eye and a second power source for energizing and causing said lamps to emit light which varies in intensity as viewed by the eye, means controlled by said first means for registering demands at said floors for connecting a lamp in one of said groups corresponding to the floor at which a demand is registered to one said source, means controlled by said second means for registering demands for service for connecting a lamp in the other of said groups corresponding to the floor at which a demand is registered to said one source, means controlled by a car set for travel in the up direction for connecting a lamp in said one group corresponding to the floor at which said car is positioned to the other said source and for interrupting a connection of said last-mentioned lamp to said one source, and means controlled by a car set for travel in the down direction for connecting a lamp in said other group corresponding to the floor at which said last-mentioned car is positioned to said other source and for interrupting a connection of said last-mentioned lamp to said one source.

4. In an elevator system comprising a plurality of elevator cars operable between a plurality of floors and having first means at said floors for registering demands for service in the up direction, and second means at said floors for registering demands for service in the down direction, a pair of groups of indicator lamps, each group comprising a number of lamps which is one less than the number of said floors and each lamp in each group corresponding to a floor, a first power source for energizing and causing said lamps to emit light which is substantially steady to the eye and a second power source for energizing and causing said lamps to emit light which flickers as viewed by the eye, means controlled by said first means for registering demands at said floors for connecting a lamp in one of said groups corresponding to the floor at which a demand is registered to said first source, means controlled by said second means for registering demands for service for connecting a lamp in the other of said groups corresponding to the floor at which a demand is registered to said first source, means controlled by a car travelling in the up direction for connecting a lamp in said one group corresponding to the floor at which said car is positioned to said second source and for interrupting a connection of said last-mentioned lamp to said first source, and means controlled by a car travelling in the down direction for connecting a lamp in said other group corresponding to the floor at which said last-mentioned car is position to said second source and for interrupting a connection of said last-mentioned lamp to said first source.

5. In an elevator system comprising a plurality of elevator cars operable between a plurality of floors and having first means at said floors for registering demands for service in the up direction, and second means at said floors for registering demands for service in the down direction, a pair of groups of indicator lamps, each group comprising a number of lamps which is one less than the number of said floors and each lamp in each group corresponding to a floor, a first power source for energizing and causing said lamps to emit light which is substantially steady to the eye and a second power source for energizing and causing said lamps to emit light which flickers as viewed by the eye, means controlled by said first means for registering demands at said floors for connecting a lamp in one of said groups corresponding to the floor at which a demand is registered to said first source, means controlled by said second means for registering demands for service for connecting a lamp in the other of said groups corresponding to the floor at which a demand is registered to said first source, means controlled by a car travelling in the up direction for connecting a lamp in said one group corresponding to the floor at which said car is positioned to said second source and for interrupting a connection of said last-mentioned lamp to said first source, means controlled by a car travelling in the down direction for connecting a lamp in said other group corresponding to the floor at which said last-mentioned car is positioned to said second source and for interrupting a connection of said last-mentioned lamp to said first source, a first manually operable switch for disconnecting said lamps from said first source and a second manually operable switch for disconnecting said lamps from said second source.

6. A system for indicating the positions of elevator cars and the directions of movement for which such cars are set and for indicating the floors at which demands for service are registered by demand means and the desired direction of such service, said system comprising a first group and a second group of electrically operable indicators, the number of indicators in each said group being less in number to the number of said floors plus one and each indicator in each group indicating demands at a floor, which is different from the floors at which demands are indicated by the remaining indicators in a group, means controlled by said cars and dependent upon the position and direction of movement of a car for providing an indication by the indicator in one of said groups corresponding to the floor position of a car set for movement in a first direction and for providing an indication by the indicator in one of said groups corresponding to the floor position of a car set for movement in a second and opposite direction and means controlled by said demand means and dependent upon the floor at which the demand means is located and the desired direction of service for providing an indication by the indicator in one of said groups corresponding to the floor at which a demand for service in said first direction is registered and for providing an indication by the indicator in one of said groups corresponding to the floor at which a demand for service in said second direction is registered, one pair of said indications being visually different and distinct from the other pair thereof.

References Cited by the Examiner
UNITED STATES PATENTS

| | | | |
|---|---|---|---|
| 2,085,135 | 6/37 | Williams | 340—21 |
| 2,509,850 | 5/50 | Von Mulinen | 340—21 |
| 2,741,755 | 4/56 | Galanty | 340—21 |

NEIL C. READ, *Primary Examiner.*

BENNETT G. MILLER, *Examiner.*